United States Patent Office 3,231,358
Patented Jan. 25, 1966

3,231,358
HERBICIDAL COMPOSITIONS AND THEIR USES
Harold F. Wilson, Moorestown, N.J., and Dougal Harold McRae, Hatboro, Pa., assignors to Rohm & Haas Company, Philadelphia, Pa., a corporation of Delaware
No Drawing. Filed May 3, 1962, Ser. No. 192,075
11 Claims. (Cl. 71—2.3)

This invention is concerned with herbicidal compositions and with a process for controlling undesired plant growth. Specifically, it is concerned with 3-methylphenyl 4-nitrophenyl ether and mixtures of it with 2,4-dichlorophenyl 4-nitrophenyl ether in herbicidal compositions and with their use in weed control or plant growth regulation.

There is a continuing need for selective herbicides which will control a variety of the major weeds which infest agronomic crops throughout the world. These should be effective at low rates of application without doing any lasting harm to the crop to be protected from weeds and should be dissipated from the soil by weathering, the action of soil organisms, chemical decomposition, or other means so as not to poison the soil sufficiently to prevent the subsequent growing of crops thereon. Pre-emergence herbicides, that is, those which are applied to the soil at about the time a crop has been planted, are especially advantageous. Also, there is a particular need for a herbicide which controls major weeds infesting cereal grain crops.

It has been proposed to use certain nitrophenyl ethers as insecticides. Some of these are sufficiently low in phytotoxicity at concentrations of about 1% in spray or dust form to permit such use and specifically 3-methylphenyl 4-nitrophenyl ether has been proposed for insecticidal use. Now it has been found that when this nitrophenyl ether is applied to soil primarily as a pre-emergence herbicide, it shows a remarkable phytotoxicity to a variety of troublesome weeds and in particular to members of the Caryophyllaceae and Compositae families. At the same time a large number of agronomic crops, both monocotyledonous and dicotyledonous, are tolerant to it.

It has been proposed to treat soil with 4-chloro-2-nitrophenyl 4-chlorophenyl ether for the selective control of grassy weeds in broadleaved crop plants. As this compound is used, it is mixed with soil to a depth of at least 0.25 inch. At weed-controlling rates of application the compound is toxic to most of the common grass type plants including typical cereal grain crops.

Careful studies have been made of the herbicidal properties of a number of nitrodiphenyl ethers. It has been determined that there is no general pattern of herbicidal activity for these. Isomeric, homologous, and analogous members of the nitrodiphenyl ether series are unpredictable with respect to selective herbicidal action. If one desires a member of this series for solving definite herbicidal problems, it can only be found by research and experimentation.

One 4-nitrophenyl ether which has been found particularly useful for the pre-emergence control of weeds is 2,4-dichlorophenyl 4-nitrophenyl ether; however, there are undesirable members of the Caryophyllaceae family of plants, such as Lychnis and Stellaria spp., and of the Compositae family, such as Matricaria, Senecio, and Vernonia spp., which this compound may not effectively control and which are well controlled with 3-methylphenyl 4-nitrophenyl ether. A combination of this ether with 2,4-dichlorophenyl 4-nitrophenyl ether provides the active ingredients for exceptionally useful herbicidal compositions which are outstanding for the control of the greatest variety of weeds in cereal grain crops.

It is unobvious from any teaching in the literature that 3-methylphenyl 4-nitrophenyl ether would have sufficient phytotoxicity to various major weeds to render it an outstanding herbicide, and that at the same time a large number of agronomic crops would be tolerant to it, making it particularly useful for selective weed control.

3-methylphenyl 4-nitrophenyl ether and 2,4-dichlorophenyl 4-nitrophenyl ether may be made by the general method of reacting m-cresol or 2,4-dichlorophenol, respectively, with p-nitrochlorobenzene in the presence of an alkaline agent such as potassium hydroxide or sodium hydroxide or a mixture of alkalis to neutralize the HCl split out, with or without the use of copper powder as a catalyst. The following preparations illustrate this.

PREPARATION 1

Preparation of 3-methylphenyl 4-nitrophenyl ether

A 2-liter flask outfitted with a stirrer, thermometer, condenser, and powder funnel is charged with 637 parts by weight (5.9 moles) of m-cresol. To this is added with stirring 329 parts (5 moles) of 85% potassium hydroxide over a period of 15 minutes as the temperature rises from 30° to 90° C. As the stirring is continued, the temperature rises to 110° C. and a dark red solution results. p-Nitrochlorobenzene is then added portionwise. The first portion of 273 parts (1.74 moles) is added in 15 minutes. After this, the dark brown reaction mixture is heated to 125° C. over a period of 45 minutes. A second portion of 273 parts (1.74 moles) to which has been added 3.5 parts of copper powder is then added over a period of 15 minutes. The dark brown reaction mixture is then heated for 3.5 hours at 120° to 130° C. The reaction mixture is poured into a mixture of 1500 parts of ice water and 1250 parts of ethylene dichloride with stirring. The organic phase is separated and washed a total of five times as follows: twice with 1500 parts of hot water, once with 1000 parts of 10% aqueous sodium hydroxide, then twice with 1500 parts of hot water. The ethylene dichloride is removed from the washed organic layer by heating at 100° C. and 20 mm. (Hg) pressure, leaving 766 parts of a reddish-brown oily residue. The residue is distilled to give as a main fraction a yellow oil distilling at 168° to 178° C. at 0.5 mm. (Hg) pressure. This amounts to 580 parts and by gas-liquid chromatography is found to be 99.4% pure 3-methylphenyl 4-nitrophenyl ether. It may be recrystallized from alcohol to give yellow crystals melting at about 60° C. which agrees with the physical properties recorded in Beilstein's Handbook, vol. VI, 1st edition, page 377.

PREPARATION 2

Preparation of 2,4-dichlorophenyl 4-nitrophenyl ether

A mixture of 86.5 parts by weight (0.53 mole) of 2,4-dichlorophenol, 27 parts (0.41 mole) of aqueous 85% potassium hydroxide solution, 50 parts (0.32 mole) of p-chloronitrobenzene, and 0.5 part of copper powder is heated for eight hours at 200° C. The reaction mixture is poured into ice water and the resulting mixture is extracted with ethylene dichloride. Layers form and are separated. The solvent layer is treated with charcoal, filtered, and washed with potassium hydroxide solution to remove free 2,4-dichlorophenol. Solvent is distilled off and the product is fractionally distilled. After a forerun of chiefly chloronitrobenzene, a main fraction is taken at 176°–180° C./0.9 mm. and is 2,4-dichlorophenyl 4-nitrophenyl ether in a yield of 60%. The distilled product can be recrystallized from a benzene-hexane mixture and then melts at 62°–65° C. The analysis of this product shows the presence of 24.8% of chlorine and 5.18% of nitrogen (theory 25.0% and 4.94% respectively for $C_{12}H_7Cl_2NO_3$)

The product agrees with the properties recorded for 4- nitro-2',4'-dichlorodiphenyl ether by Raiford et al. in the Journal of the American Chemical Society 52, 1208 (1930).

Under conditions of use 3-methylphenyl 4-nitrophenyl ether and also its admixtures with 2,4-dichlorophenyl 4-nitrophenyl ether are applied to soil or other growth medium or to growing plants from an aqueous dispersion or from a solid formulation.

Liquid dispersions may be made by dissolving the active ingredient 3-methylphenyl 4-nitrophenyl ether or the admixture of 4-nitrophenyl ethers in a water-miscible organic solvent such as acetone or dioxane and then extending these solutions with water. Other dispersions may be obtained by first preparing emulsion concentrates and then extending these with water. Emulsion concentrates are made by dissolving 3-methylphenyl 4-nitrophenyl ether or its admixtures with 2,4-dichlorophenyl 4-nitrophenyl ether in a water-immiscible, agronomically acceptable organic solvent such as toluene, xylene, aromatic naphthas, cyclohexanone, or mixtures of these and incorporating into the solutions one or more emulsifying agents soluble in the solvent. Suitable emulsifiers are polyethoxy derivatives of alkylphenols or of long-chained alcohols, fatty acids, alkylamines, or mercaptans. Other surface-active agents such as other types of wetting agents, dispersing agents, or spreading agents, which in many instances are represented by various alkylaryl or alkyl sulfates or sulfonates, may be used alone or in admixture with the polyethoxy compounds. Typical emulsion concentrates may be made as follows:

Active ingredient, 10–80%, preferably 25–50%;
Emulsifying etc. agents, 1–10%, preferably 2–7%;
Solvent, quantity sufficient to make 100%.

Examples of such compositions follow:

EXAMPLE 1

A formulation was prepared by dissolving 580 parts by weight of 3-methylphenyl 4-nitrophenyl ether, 44 parts of p-diisobutylphenoxypolyethoxyethanol containing about 20 ether groups, and 49 parts of calcium dodecylbenzenesulfonate in 1630 parts of xylene and 17 parts of methanol. This composition is a homogeneous brown liquid which is readily dispersed in water.

A similar preparation was made in which about half of the 3-methylphenyl 4-nitrophenyl ether in the above formulation was replaced with 290 parts of 2,4-dichlorophenyl 4-nitrophenyl ether to give a 25% emulsion concentrate containing equal quantities of the two 4-nitrophenyl ethers as active ingredients.

EXAMPLE 2

A solution of 25 parts of 3-methylphenyl 4-nitrophenyl ether and 25 parts of 2,4-dichlorophenyl 4-nitrophenyl ether is made by stirring these ethers with 105 parts of cyclohexanone and 35 parts of xylene. There is then added 5 parts of dinonylphenoxypolyethoxyethanol having an average of 30 ethoxy groups and 5 parts of calcium dodecylbenzenesulfonate. A clear, brown solution ready for use as an emulsion concentrate results.

EXAMPLE 3

A water-extendable solution is made by dissolving 35 parts of 3-methylphenyl 4-nitrophenyl ether and 65 parts of 2,4-dichlorophenyl 4-nitrophenyl ether in 280 parts of heavy aromatic naphtha having a flash point (tag closed cup) of 136° F. along with 10 parts of a water-soluble ethylene oxide reaction product of diamylphenol and 10 parts of calcium dodecylbenzenesulfonate.

Flowable emulsions, which are related to the emulsion concentrates, are made by dissolving 3-methylphenyl 4-nitrophenyl ether in a water-immiscible solvent, such as xylene, a heavy aromatic naphtha, pine oil, or an oleic acid ester in which are incorporated surface active agents of the types used in the emulsion concentrates previously discussed, usually in amounts of 10–20% of the weight of the solution, then adding water with stirring to achieve a thick or viscous water-in-oil emulsion which is just pourable under conditions of use. With this type of emulsion the active ingredient is usually in the range of 40% to 80%, preferably 45% to 75% by weight of the formulation.

Solid dispersions may be made by formulating 3-methylphenyl 4-nitrophenyl ether or its mixtures with 2,4-dichlorophenyl 4-nitrophenyl ether as wettable powders. These are made by mixing the active ingredients into agronomically acceptable solid carriers into which wetting agents, dispersing agents, and/or other surface active agents may be incorporated. Suitable carriers or diluents for this purpose may be found among inorganic carriers such as silicas, limes, mineral carbonates, silicates, and clays, typical of which are magnesia, magnesium carbonate, chalk, calcium silicate, diatomaceous earth, mica, talc, pyrophyllite, kaolin, bentonite, fuller's earth, or aluminum silicates, and among organic carriers such as walnut shell flour, soybean flour, and finely ground sawdust.

Typical wettable powders may be made as follows:

Active ingredient, 10–80%, preferably 25–65%;
Surface-active agent(s), 1–8%, preferably 2–5%;
Solid carrier, quantity sufficient to make 100%.

Examples are given below.

EXAMPLE 4

Fifty parts of 3-methylphenyl 4-nitrophenyl ether and 47 parts of a hydrated silica clay were intimately ground together. There was added 2.5 parts of sodium lignosulfonate and 0.5 part of octylphenoxypolyethoxyethanol having an average of about 10 ether groups and the blending continued until a uniform mixture was produced.

If in the above example one-half of the 3-methylphenyl 4-nitrophenyl ether is replaced with 2,4-dichlorophenyl 4-nitrophenyl ether, a 50% wettable powder containing equal quantities of the two 4-nitrophenyl ethers as active ingredients results.

Other formulations which may be used include dusts and granular preparations.

Dusts are made by incorporating 3-methylphenyl 4-nitrophenyl ether in one or more finely divided inert solids, such as mentioned above. The 4-nitrophenyl ethers may be mechanically mixed with the solid diluent or else may be dissolved in a solvent and this solution mixed with the solid diluent and the solvent subsequently removed. Dust concentrates may be made and these commonly contain from 20 to 80% of the herbicidally active ingredient. These are generally subsequently diluted for use. As applied, such agricultural dusts may contain from 1% to 20% of the active ingredient. As shown above and in the example which follows, 3-methylphenyl 4-nitrophenyl ether may be used in conjunction with 2,4-dichlorophenyl 4-nitrophenyl ether.

EXAMPLE 5

A solution of 75 parts by weight of 3-methylphenyl 4-nitrophenyl ether and of 25 parts of 2,4-dichlorophenyl 4-nitrophenyl ether in 200 parts of acetone was slowly added to 400 parts of a 50:50 mixture of talc and finely ground magnesium carbonate. The mixture was blended in a ribbon blender as the acetone was allowed to volatilize to provide a dust containing 20% of the active ingredients. It was especially effective in fields and on turf grasses for controlling chickweed and galinsoga.

Granular formulations may be prepared by incorporating 3-methylphenyl 4-nitrophenyl ether or mixtures of it with 2,4-dichlorophenyl 4-nitrophenyl ether into granular or pelletized forms of agronomically acceptable carries such as those made from granular clays, vermiculite, charcoal, ground corn cobs, or bran in a range of sizes from 16 to 64 mesh (U.S. standard screen size).

EXAMPLE 6

Vermiculite of 30-mesh in an amount of 900 parts by weight is impregnated with a mixture of 25 parts of 3-methylphenyl 4-nitrophenyl ether and 75 parts of 2,4-dichlorophenyl 4-nitrophenyl ether and thoroughly mixed to give a homogeneous granular formulation. This is especially efficacious for the control of grassy weeds.

By agronomically acceptable solvent or carrier is meant any substance which can be used to dissolve, disperse, or diffuse the active agent within it without impairing the effectiveness of the toxic agent, and which contributes no lasting deleterious effect to the soil or crops to which it is applied.

Ratios of mixtures of 3-methyl 4-nitrophenyl ether and 2,4-dichlorophenyl 4-nitrophenyl ether which may be advantageously employed are 20:80 to 80:20 by weight and are preferably 30:70 to 70:30.

The active herbicidal agent, either as 3-methylphenyl 4-nitrophenyl ether or its mixtures with 2,4-dichlorophenyl 4-nitrophenyl ether, is usually applied in spray or dust at a rate of about 0.5 to 10 lb./a. (pounds per acre), preferably at about one to 4 lb./a. Carrier volumes vary in accordance with the type of application involved. For some ground equipment applying pre-emergence sprays to soil or directed sprays about plants a standard carrier rate is about 50 gallons per acre, although higher and lower carrier rates may be used. In other equipment disseminating highly dispersed sprays under high pressure a carrier rate of 10 or 20 gallons per acre is more usual, while airplane sprays are normally applied at carrier rates of 5 to 10 gallons per acre.

3-methylphenyl 4-nitrophenyl ether is highly effective and selective when used as a pre-emergence herbicide and is also useful in post-emergence applications in conjunction with tolerant agronomic crops. In pre-emergence use seeds are planted in soil or other growth medium, usually just prior to the application of the 4-nitrophneyl ether. In studies with 3-methylphenyl 4-nitrophneyl ether at 2, 4, and 6 lb./a., many crops were found to be tolerant, such as cereal grain and other gramineous crops, including barley, field corn, millet, oats, rice, rye, sorghum, Sudan, grass, sweet corn, turf grasses and wheat; leguminous crops such as cowpeas, lespedeza, lima beans, peanuts, peas, snap beans, and soybeans, and miscellaneous crops such as cotton, flax, potatoes, radish, safflower, sugar beets, table beets, and turnips.

In evaluation tests, weed counts were made about three weeks after the pre-emergence herbicide treatments were applied. It was found that 83% of all dicotyledonous weeds and 92% of all monocotyledonous weeds in the treated areas were controlled at 2 lb./a., and over 97% of all weeds were controlled at 6 lb./a., as compared with untreated control areas. Weeds present included pigweeds, lambsquarters, nutgrass, mustard, crabgrass, purslane, chickweed, scarlet pimpernel, plantains, dock, galinsoga, barnyardgrass, foxtail, and carpet weed.

In post-emergence applications wherein 3-methylphenyl 4-nitrophenyl ether was applied to growing crops at 4 lb./a., such crops as broccoli, carrots, field corn, flax, lespedeza, lima beans, sorghum, sweet corn, and trefoil were tolerant, and weeds were controlled, particularly dicotyleodonous ones, for at least as long as the 50 days during which observations were made.

A field test was conducted in which the spring cereals barley, oats, rye, and wheat were planted on a day in April. The next day, standard plots were treated in triplicate by pre-emergence applications to the surface of the soil with aqueous sprays made from emulsion concentrate formulations of 3-methylphenyl 4-nitrophneyl ether (Compound A) or 2,4-dichlorophenyl 4-nitrophenyl ether (Compound B) at 1, 2, 3, and 4 pounds of the active ingredient per acre; and combinations of Compounds A and B in which 1 pound of each compound, 1.5 pounds of each, and 2 pounds of each were used. Untreated plots were left as controls. The weed populations were allowed to grow at will. Evaluations of the weeds present and phytotoxicity to the cereals were made 48, 65, and 88 days after treatment. The dominant weeds present were chickweed, galinsoga, crabgrass, and foxtail. Ragweed, lambsquarters, pigweeds, and smartweed were present in lesser amounts.

There were found variations between the two 4-nitrophenyl ethers with regard to their action on different varieties of weeds. Monocotyledonous weeds in general were somewhat better controlled with 2,4-dichlorophenyl 4-nitrophenyl ether than with 3-methylphenyl 4-nitrophenyl ether, whereas the reverse was true for dicotyledonous weeds. Also, within either class of weeds differences were observed for varieties of weeds. The result was that the overall effect of the combination was to give very high control of weeds in general at relatively low rates of application for each ether. Rates of application of a combination of Compounds A and B using as little as 1 lb./a. of each gave 90% to 100% control of the total weed population, whereas 3-methylphenyl 4-nitrophenyl ether at 1 lb./a. by itself gave less than 50% control of monocotyledonous weeds and 2,4-dichlorophenyl 4-nitrophenyl ether by itself at 1 lb.%a. gave less than 75% control of dicotyledonous weeds. Surprisingly, the combination of the two ethers at this low rate of each gave essentially complete control of all types of weeds.

At the same time the effective control of weeds was obtained with a minimum degree of phytotoxicity to cereal grain crops which grew in treated areas. At concentrations of 2,4-dichlorophenyl 4-nitrophenyl-ether which are effective for controlling weeds among some cereals, particularly barley and oats, there tended to be some temporary damage to the cereal grain crops. The combination of the two permitted practically complete control of the weeds with phytotoxicities one-quarter to one-half of what would be obtained for 2,4-dichlorophenyl 4-nitrophenyl ether if applied alone at weed-controlling rates. The sensitivity of cereals to 2,4-dichlorophenyl 4-nitrophenyl ether was advantageously modified by the presence of 3-methylphenyl 4-nitrophenyl ether.

Field test results with 3-methylphenyl 4-nitrophenyl ether and mixtures of it with 2,4-dichlorophenyl 4-nitrophenyl ether demonstrate that weeds normally resistant to many pre-emergence herbicides, such as chickweed and galinsoga, can now be effectively controlled.

Other tests were run in areas planted to cotton, peanuts, field corn, sweet corn, snap beans, and soybeans. Mixtures of 1, 1.5, and 2 pounds of each of Compounds A and B and of 1 lb. of Compound A and 2 lb. of Compound B gave almost complete control of all weeds present, whether grassy or broad-leaved in nature, in periods of observations up to three months.

In another field test tomato plants were grown in a cold frame to approximately one foot in height and were then transplanted to the field in rows about five feet apart. After the transplants had become established, they were cultivated to remove growing weeds. Immediately thereafter the area around the base of the tomato plants was treated with a directed spray of an aqueous dispersion containing 3-methylphenyl 4-nitrophenyl ether as approximately an 18 inch band and at a rate of about 4 lb./a. The area was known to be populated with such weeds as chickweeds, corn cockle, galinsoga, ironweed, ragworts, knotweed, smartweed, and false chamomile. Excellent control of these weeds was obtained during the remaining growing period of the tomato plants and through the harvest period for the tomato fruit. This method of application permits cultivation between rows of plants and at the same time avoids cultivation near the base of the plants with the consequent disturbing of roots. The necessity for any hand hoeing is eliminated.

In field tests it was found that 2,4-dichlorophenyl 4-nitrophenyl ether applied to the surface of the soil in pre-emergence herbicidal applications is rendered inactive when it is subsequently mixed into the soil. When 3-methylphenyl 4-nitrophenyl ether is similarly treated, it is not thus inactivated. Mixtures of Compounds A and B, therefore, provide particularly advantageous herbicidal compositions for long range weed control wherein, even if Compound B is inactivated by some soil disturbance, Compound A continues to protect the area from growth of weeds.

The 3-methylphenyl 4-nitrophenyl ether and its admixtures with 2,4-dichlorophenyl 4-nitrophenyl ether are of particular interest when mixed with fertilizers and fertilizing materials. Such mixtures with fertilizers may be made in a variety of ways. For example, molten 3-methylphenyl 4-nitrophenyl ether or its mixtures with 2,4-dichlorophenyl 4-nitrophenyl ether may be sprayed onto particles of mixed fertilizer or of fertilizer ingredients, such as ammonium sulfate, ammonium nitrate, ammonium phosphate, potassium chloride or sulfate, calcium phosphate or urea singly or in admixture. Also, the solid 4-nitrophenyl ethers and the solid fertilizing material may be admixed in mixing or blending equipment. Similarly, a solution of ethers in a volatile solvent may be applied to particles of fertilizer or fertilizer ingredients. A particularly useful form in which the 4-nitrophenyl ethers are incorporated with fertilizers is in granular formulations. As commonly practiced, the amount of 4-nitropheinyl ethers incorporated with the fertilizing material is from 5% to 25%. This type of solid composition serves a dual purpose in providing fertilizing material for the rapid growth of desired plants and at the same time helps control the growth of undesired plants in one operation without the necessity of separate applications. This is particularly important in aquatic weed control, wherein there may be controlled not only plants growing in soil but also those in water (algae).

As a specific example there is prepared a mixture of 30 parts by weight of 3-methylphenyl 4-nitrophenyl ether and 70 parts of 2,4-dichlorophenyl 4-nitrophenyl ether and the mixture is heated until it is in a molten state. As the melt it is applied to 400 parts of urea in a form sometimes known as urea prills and the product is rendered essentially uniform by mixing in a blender. In the same way a similar product may be made in which the ratio of 3-methylphenyl 4-nitrophenyl ether and 2,4-dichlorophenyl 4-nitrophenyl ether is 70:30. In each case the product is a free-flowing solid readily handled in equipment designed for disseminating fertilizers.

These compositions are particularly useful for applying to rice paddies which have been flooded prior to emergence of weeds. This treatment prevents the future growth of grassy and dicotyledonous weeds and the growth of algae, also controls some forms of lower animal life, and stimulates the growth of the rice plants.

We claim:

1. A herbicidal composition consisting essentially of the active ingredients 3-methylphenyl 4-nitrophenyl ether and 2,4-dichlorophenyl 4-nitrophenyl ether dispersed in an agronomically acceptable carrier therefor, said ethers being present in said composition in amounts sufficient to provide in the presence of each other control of growth of weeds.

2. A herbicidal composition consisting essentially of the active ingredients 3-methylphenyl 4-nitrophenyl ether and 2,4-dichlorophenyl 4-nitrophenyl ether in a weight ratio between 20:80 and 80:20, said ethers being dispersed in an agronomically acceptable carrier, and said ethers being present in said composition in amounts sufficient to provide in the presence of each other control of growth of weeds.

3. A herbicidal composition consisting essentially of the active ingredients 3-methylphenyl 4-nitrophenyl ether and 2,4-dichlorophenyl 4-nitrophenyl ether in a weight ratio between 30:70 and 70:30, said ethers being dispersed in an agronomically acceptable carrier together with a minor proportion of a surface active agent, and said ethers being present in said composition in amounts sufficient to provide in the presence of each other control of growth of weeds.

4. A herbicidal composition consisting essentially of the active ingredients 3-methylphenyl 4-nitrophenyl ether and 2,4-dichlorophenyl 4-nitrophenyl ether in a weight ratio between 20:80 and 80:20, said ethers being dissolved in an agronomically acceptable organic solvent containing an emulsifying agent, said ethers being present in an amount of 10 to 80 parts by weight, said emulsifying agent being present in an amount of 1 to 10 parts by weight, and said solvent being present in an amount sufficient to bring the total to 100 parts by weight.

5. A herbicidal composition consisting essentially of the active ingredients 3-methylphenyl 4-nitrophenyl ether and 2,4-dichlorophenyl 4-nitrophenyl ether in a weight ratio between 20:80 and 80:20, said ethers being dispersed in a finely divided agronomically acceptable solid carrier, and said ethers being present in said composition in amounts sufficient to provide in the presence of each other control of growth of weeds.

6. A herbicidal composition consisting essentially of active ingredients 3-methylphenyl 4-nitrophenyl ether and 2,4-dichlorophenyl 4-nitrophenyl ether in a weight ratio between 20:80 and 80:20, said ethers being dispersed in an agronomically acceptable solid carrier containing a surface active agent, said ethers being present in an amount of 10 to 80 parts by weight, said surface active agent being present in an amount of 1 to 8 parts by weight, and said solid carrier being present in an amount sufficient to bring the total to 100 parts by weight.

7. A method of selectively controlling growth of weeds among agronomic crops which consists essentially of applying a mixture of 3-methylphenyl 4-nitrophenyl ether and 2,4-dichlorophenyl 4-nitrophenyl ether in a weight ratio of 20:80 to 80:20 to soil before emergence of weeds therefrom, said mixture of ethers being applied in an amount sufficient to control growth of weeds and at a rate of 0.5 pound to 10 pounds per acre.

8. A method of selectively controlling growth of grassy and broad-leaved weeds among cereal grain crops which consists essentially of applying a mixture of 3-methylphenyl 4-nitrophenyl ether and 2,4-dichlorophenyl 4-nitrophenyl ether in a weight ratio of 20:80 to 80:20 to soil prior to emergence of plants therefrom in an amount of said mixture sufficient to control growth of said weeds and at a rate of 0.5 to 10 pounds per acre.

9. A method of selectively controlling growth of grassy and broad-leaved weeds among cereal grain crops which consists essentially of applying a mixture of 3-methylphenyl 4-nitrophenyl ether and 2,4-dichlorophenyl 4-nitrophenyl ether in a weight ratio of 30:70 to 70:30 to surface of soil in which said crops are planted in an amount of said mixture sufficient to control growth of said weeds and at a rate of 0.5 pound to 10 pounds per acre.

10. A herbicidal composition consisting essentially of the active ingredients 3-methylphenyl 4-nitrophenyl ether and 2,4-dichlorophenyl 4-nitrophenyl ether in a weight ratio of 20:80 to 80:20 carried on particles of fertilizing material, said ethers being present in said composition in amounts sufficient to provide in the presence of each other control of growth of weeds.

11. A herbicidal composition according to claim 10 wherein the fertilizing material is urea.

References Cited by the Examiner

UNITED STATES PATENTS

| | | | |
|---|---|---|---|
| 2,726,946 | 12/1955 | Mussell | 71—2.3 |
| 3,060,235 | 10/1962 | Martin et al. | 71—2.6 XR |
| 3,080,225 | 3/1963 | Wilson | 71—2.3 |
| 3,154,398 | 10/1964 | McRae | 71—2.6 |

OTHER REFERENCES

Beilstein Orgonische Chemie, vol. VI, First edition, page 377.

Raiford et al.: "J. Am. Chem. Soc.," 52, 1205 to 1209 (1930).

LEWIS GOTTS, *Primary Examiner.*